United States Patent
Tomita

(10) Patent No.: US 10,472,477 B2
(45) Date of Patent: Nov. 12, 2019

(54) POLYCARBONATE RESIN COMPOSITION FOR THIN OPTICAL COMPONENT, AND THIN OPTICAL COMPONENT

(71) Applicant: Mitsubishi Engineering-Plastics Corporation, Minato-ku (JP)

(72) Inventor: Keisuke Tomita, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 191 days.

(21) Appl. No.: 15/527,962

(22) PCT Filed: Dec. 14, 2015

(86) PCT No.: PCT/JP2015/084878
§ 371 (c)(1),
(2) Date: May 18, 2017

(87) PCT Pub. No.: WO2016/111117
PCT Pub. Date: Jul. 14, 2016

(65) Prior Publication Data
US 2017/0362398 A1    Dec. 21, 2017

(30) Foreign Application Priority Data

Jan. 7, 2015   (JP) ................................. 2015-001768
Jun. 19, 2015  (JP) ................................. 2015-123745

(51) Int. Cl.
| | | |
|---|---|---|
| *C08J 5/18* | (2006.01) | |
| *C08K 5/1515* | (2006.01) | |
| *C08L 69/00* | (2006.01) | |
| *C08L 71/02* | (2006.01) | |
| *C08K 5/06* | (2006.01) | |
| *C08K 5/52* | (2006.01) | |
| *G02B 1/04* | (2006.01) | |
| *C08K 5/526* | (2006.01) | |

(52) U.S. Cl.
CPC ...................... *C08J 5/18* (2013.01);
*C08K 5/06* (2013.01); *C08K 5/1515* (2013.01);
*C08K 5/52* (2013.01); *C08K 5/526* (2013.01);
*C08L 69/00* (2013.01); *C08L 71/02* (2013.01);
*G02B 1/04* (2013.01); *G02B 1/045* (2013.01);
*C08J 2369/00* (2013.01)

(58) Field of Classification Search
CPC ..... C08J 5/18; C08K 5/06; C08K 5/52; C08K 5/526; C08K 5/1515; G02B 1/045; G02B 1/04; C08L 71/02; C08L 69/00

USPC .......................................................... 524/147
See application file for complete search history.

(56) References Cited

U.S. PATENT DOCUMENTS

| | | | |
|---|---|---|---|
| 5,187,211 A | 2/1993 | Lundy et al. | |
| 6,941,057 B1 | 9/2005 | Okamoto et al. | |
| 2003/0069390 A1* | 4/2003 | Satoh ................. | C08G 18/4854 |
| | | | 528/425 |
| 2007/0293600 A1 | 12/2007 | Tamura | |
| 2009/0185363 A1* | 7/2009 | Ishikawa .................. | C08L 69/00 |
| | | | 362/97.1 |
| 2012/0309874 A1 | 12/2012 | Takimoto et al. | |
| 2014/0350148 A1† | 11/2014 | Takimoto | |
| 2014/0364546 A1† | 12/2014 | Okamoto | |
| 2016/0122533 A1† | 5/2016 | Tomita | |
| 2016/0326365 A1* | 11/2016 | Sakaki ................. | G02B 6/0065 |
| 2017/0218198 A1* | 8/2017 | Bahn ....................... | C08L 63/10 |

FOREIGN PATENT DOCUMENTS

| | | |
|---|---|---|
| JP | 64-22959 A | 1/1989 |
| JP | 9-3315 A | 1/1997 |
| JP | 9-227785 A | 9/1997 |
| JP | 11-158364 A | 6/1999 |
| JP | 2001-208917 A | 8/2001 |
| JP | 2001-215336 A | 8/2001 |
| JP | 2006-199848 A | 8/2006 |
| JP | 4069364 B2 | 4/2008 |
| WO | WO 2011/083635 A1 | 7/2011 |
| WO | WO 2015/011994 A1 | 1/2015 |
| WO | WO 2015/087526 * | 6/2015 |
| WO | WO 2015/087526 A1 | 6/2015 |

OTHER PUBLICATIONS

International Search Report dated Jan. 12, 2016 in PCT/JP2015/084878 filed Dec. 14, 2015.

* cited by examiner
† cited by third party

*Primary Examiner* — Doris L Lee
(74) *Attorney, Agent, or Firm* — Oblon, McClelland, Maier & Neustadt, L.L.P.

(57) ABSTRACT

Provided are a polycarbonate resin composition for a thin optical component that has a high transmittance and a good hue, and a thin optical component. The polycarbonate resin composition for a thin optical component contains, per 100 mass parts of a polycarbonate resin (A), 0.1 to 4 mass parts of a polyalkylene glycol copolymer (B) having a linear alkylene ether unit (B1) given by general formula (I) and a branched alkylene ether unit (B2) selected from units given by general formulas (II-1) to (II-4), and 0.005 to 0.5 mass parts of a phosphorus stabilizer (C).

20 Claims, No Drawings

POLYCARBONATE RESIN COMPOSITION FOR THIN OPTICAL COMPONENT, AND THIN OPTICAL COMPONENT

TECHNICAL FIELD

The present invention relates to a polycarbonate resin composition for a thin optical component and to a thin optical component, and specifically relates to a polycarbonate resin composition for a thin optical component that exhibits a high transmittance and a good hue and to a thin optical component obtained by molding this polycarbonate resin composition.

BACKGROUND ART

A planar light source device is incorporated in the liquid-crystal display devices used in, for example, personal computers, cell phones, and so forth, in order to respond to demands for greater thinness, lighter weight, greater labor savings, and higher definition. In addition, with the goal of functioning to uniformly and efficiently guide the incident light to the liquid-crystal display side, this planar light source device is provided with a flat plate-shaped light guide plate or a light guide plate that has a wedge-shaped cross section in which one surface has a uniformly sloped surface. In some instances, a peak-and-valley pattern is also formed in the surface of the light guide plate in order to provide a light scattering function.

Such light guide plates are obtained by the injection molding of a thermoplastic resin, and the aforementioned peak-and-valley pattern is generated by transfer from a peak-and-valley region formed in the surface of an insert. Light guide plates have in the past been molded from a resin material such as polymethyl methacrylate (PMMA); however, of late a conversion has been underway to the more highly heat-resistant polycarbonate resin materials due to the trends of demand for display devices that render sharper images and the higher temperatures within the device caused by the heat produced in proximity to the light source.

Polycarbonate resins exhibit excellent mechanical properties, thermal properties, and electrical properties and an excellent weatherability; however, they have a lower light transmittance than PMMA or the like and the problem thus arises of a lower brightness when a planar light source assembly is constructed of a light source and a polycarbonate resin light guide plate. In addition, there has lately been demand for a small chromaticity difference between the incident light area of the light guide plate and locations distant from the incident light area, but a problem here is that polycarbonate resin more readily undergoes yellowing than does PMMA resin.

A method is proposed in PTL 1 in which the light transmittance and brightness are improved by the addition of an acrylic resin and an alicyclic epoxy; a method is proposed in PTL 2 in which the brightness is improved by modifying the polycarbonate resin terminals and raising the transferability of the peak-and-valley region to the light guide plate; and a method is proposed in PTL 3 in which the brightness is improved by improving this transferability by introducing a copolyester carbonate that has an aliphatic segment.

However, in the case of the method in PTL 1, while the addition of the acrylic resin does bring about a good hue, the light transmittance and brightness cannot be raised due to the appearance of cloudiness. The addition of alicyclic epoxy can improve the transmittance, but a hue-improving effect is not recognized for this. In the case of the methods in PTL 2 and PTL 3, an improvement in the flowability and transferability can be expected, but the problem occurs of a reduction in the heat resistance.

On the other hand, the incorporation of, for example, a polyethylene glycol or a poly(2-methyl)ethylene glycol in thermoplastic resins such as polycarbonate resins is known, and PTL 4 describes a γ-radiation resistant polycarbonate resin that contains same, while PTL 5 describes a thermoplastic resin composition that is provided by incorporating same in, for example, PMMA, and that has an excellent static inhibition and an excellent surface appearance.

PTL 6 proposes that the transmittance and hue be improved through the incorporation of a polyethylene glycol or poly(2-alkyl)ethylene glycol with the formula X—O—[CH(—R)—CH$_2$—O]$_n$—Y (R is a hydrogen atom or a C$_{1-3}$ alkyl group). Some improvement in the transmittance and yellowing (yellow index: YI) is seen due to the incorporation of polyethylene glycol or poly(2-alkyl)ethylene glycol.

However, the trends toward greater thinness and greater thinness in large sizes have in particular been developing quite rapidly recently with regard to various mobile terminals such as smart phones and tablet form-factor terminals, and an edge configuration, in which light injection into the light guide plate is carried out from a lateral edge, is being adopted rather than the vertical configuration and a satisfactory brightness has come to be required from ultrathin light sources. The current state of such high-end light guide plates is that they do not satisfy the required specifications for transmittance and YI level that are achieved by the above-described prior art.

CITATION LIST

Patent Literature

[PTL 1] Japanese Patent Application Laid-open No. H11-158364
[PTL 2] Japanese Patent Application Laid-open No. 2001-208917
[PTL 3] Japanese Patent Application Laid-open No. 2001-215336
[PTL 4] Japanese Patent Application Laid-open No. H1-22959
[PTL 5] Japanese Patent Application Laid-open No. H9-227785
[PTL 6] Japanese Patent No. 4,069,364

SUMMARY OF INVENTION

Technical Problem

The present invention was pursued considering the actual circumstances described above, and an object of the present invention is to provide a polycarbonate resin composition for a thin optical component that exhibits a good transmittance and hue while in no way impairing the characteristics inherent to polycarbonate resins.

Solution to Problem

As a result of extensive and intensive investigations directed to achieving the aforementioned object, the present inventor surprisingly discovered that, through the incorporation in polycarbonate resin of a prescribed amount of a copolymer of a polyalkylene glycol having alkyl branches with a polyalkylene glycol in which the methylene group is bonded in a linear regime, a better transmittance and a very good hue can be achieved in comparison to the poly(2-alkyl) ethylene glycol described in the prior art. The present invention was achieved based on this discovery.

The present invention provides the following, as described herebelow: a polycarbonate resin composition for a thin optical component, a thin optical component, and a method of producing a thin optical component.

[1] A polycarbonate resin composition for a thin optical component, containing, per 100 mass parts of a polycarbonate resin (A), 0.1 to 4 mass parts of a polyalkylene glycol copolymer (B) having a linear alkylene ether unit (B1) given by general formula (I) below and a branched alkylene ether unit (B2) selected from units given by general formulas (II-1) to (II-4) below, and 0.005 to 0.5 mass parts of a phosphorus stabilizer (C).

[Chemical 1]

The n in formula (I) is an integer from 3 to 6.

[Chemical 2]

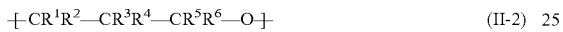

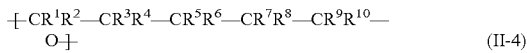

In formulas (II-1) to (II-4), $R^1$ to $R^{10}$ represent a hydrogen atom or an alkyl group having 1 to 3 carbons, and in each of formulas (II-1) to (II-4), at least one of $R^1$ to $R^{10}$ is an alkyl group having 1 to 3 carbons.

[2] The polycarbonate resin composition for a thin optical component according to [1], further containing an epoxy compound (D) at 0.0005 to 0.2 mass parts per 100 mass parts of the polycarbonate resin (A).

[3] The polycarbonate resin composition for a thin optical component according to [1] or [2], wherein the molar ratio between the (B1) unit and the (B2) unit in the polyalkylene glycol copolymer (B) is 95/5 to 5/95.

[4] The polycarbonate resin composition for a thin optical component according to any of [1] to [3], wherein the polyalkylene glycol copolymer (B) is a copolymer composed of a tetramethylene ether unit and the unit given by general formula (II-3) above.

[5] The polycarbonate resin composition for a thin optical component according to [4], wherein the polyalkylene glycol copolymer (B) is a copolymer composed of the tetramethylene ether unit and a 3-methyltetramethylene ether unit.

[6] The polycarbonate resin composition for a thin optical component according to any of [1] to [3], wherein the polyalkylene glycol copolymer (B) is a copolymer composed of a tetramethylene ether unit and the unit given by general formula (II-1) above.

[7] The polycarbonate resin composition for a thin optical component according to [6], wherein the polyalkylene glycol copolymer (B) is a copolymer composed of the tetramethylene ether unit and a 2-methylethylene ether unit.

[8] The polycarbonate resin composition for a thin optical component according to any of [1] to [3], wherein the polyalkylene glycol copolymer (B) is a copolymer composed of a tetramethylene ether unit and the unit given by general formula (II-2) above.

[9] The polycarbonate resin composition for a thin optical component according to [8], wherein the polyalkylene glycol copolymer (B) is a copolymer composed of the tetramethylene ether unit and a 2,2-dimethyltrimethylene ether unit.

[10] The polycarbonate resin composition for a thin optical component according to any of [1] to [9], wherein the viscosity-average molecular weight (Mv) of the polycarbonate resin (A) is 10,000 to 15,000.

[11] The polycarbonate resin composition for a thin optical component according to any of [1] to [10], wherein the spectral transmittance at a wavelength of 420 nm measured for an optical path length of 300 mm is at least 500.

[12] A thin optical component obtained by molding the polycarbonate resin composition according to any of [1] to [11].

[13] The thin optical component according to [12], which is a light guide plate having a thickness of not more than 1 mm.

[14] A method of producing a thin optical component having a thickness of not more than 1 mm, the method including:
injection molding the polycarbonate resin composition according to any of [1] to [11] at 305° C. to 380° C.

Advantageous Effects of Invention

The present invention, through the incorporation in combination with a phosphorus stabilizer (C) of a polyalkylene glycol copolymer (B) having a linear alkylene ether unit (B1) and a branched alkylene ether unit (B2), can provide a polycarbonate resin composition for a thin optical component that exhibits a good transmittance and hue and can do so while in no way impairing the characteristics inherent to polycarbonate resins, and can also provide a thin optical component that has a good transmittance and hue.

DESCRIPTION OF EMBODIMENTS

The present invention is particularly described below through, inter alia, embodiments and illustrative materials.

In this Description, unless specifically indicated otherwise, the "to" in a numerical value range is used in the sense that the numerical values provided before and after the "to" are included as the lower limit value and the upper limit value.

SUMMARY

The polycarbonate resin composition for a thin optical component of the present invention contains, per 100 mass parts of a polycarbonate resin (A), 0.1 to 4 mass parts of a polyalkylene glycol copolymer (B) having a linear alkylene ether unit (B1) given by general formula (I) above and a branched alkylene ether unit (B2) selected from units given by general formulas (II-1) to (II-4) above, and 0.005 to 0.5 mass parts of a phosphorus stabilizer (C).

A detailed description follows for, inter alia, each of the components constituting the polycarbonate resin composition of the present invention and for the thin optical component of the present invention.

[Polycarbonate Resin (A)]

There is no limitation on the species of polycarbonate resin used in the present invention, and a single species of polycarbonate resin may be used or any combination of two or more species in any proportions may be used.

Polycarbonate resins are polymers with a basic structure that has the carbonate bond and is given by the formula —[—O—X—O—C(=O)—]—.

X in the formula is generally a hydrocarbon, and an X that incorporates a heteroatom or heterobond may be used in order to provide various properties.

Polycarbonate resins can be classified into aromatic polycarbonate resins, in which the carbons directly bonded to the carbonate bond are each aromatic carbons, and aliphatic polycarbonate resins, in which they are aliphatic carbons, and either can be used. Aromatic polycarbonate resins are preferred here from the standpoint of the heat resistance, mechanical properties, electrical properties and the like.

There are no limitations on the specific species of polycarbonate resin, and it can be exemplified by the polycarbonate polymers obtained by the reaction of a carbonate precursor with a dihydroxy compound. A polyhydroxy compound or the like may also be reacted here in addition to the dihydroxy compound and carbonate precursor. A method may also be used in which carbon dioxide is reacted as the carbonate precursor with a cyclic ether. The polycarbonate polymer may be linear or may be a branched chain. The polycarbonate polymer may be a homopolymer composed of a single repeating unit or may be a copolymer having two or more repeating units. This copolymer can be selected from various copolymerization regimes, e.g., random copolymers, block copolymers, and so forth. These polycarbonate polymers are generally thermoplastic resins.

Among monomers that are starting materials for aromatic polycarbonate resins, the aromatic dihydroxy compounds can be exemplified by the following:

dihydroxybenzenes such as 1,2-dihydroxybenzene, 1,3-dihydroxybenzene (i.e., resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as
2,2-bis(4-hydroxyphenyl)propane (i.e., bisphenol A),
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(3,5-dimethyl-4-hydroxyphenyl)propane,
2,2-bis(3-cyclohexyl-4-hydroxyphenyl)propane,
2-(4-hydroxyphenyl)-2-(3-cyclohexyl-4-hydroxyphenyl)propane,
α,α'-bis(4-hydroxyphenyl)-1,4-diisopropylbenzene,
1,3-bis[2-(4-hydroxyphenyl)-2-propyl] benzene,
bis(4-hydroxyphenyl)methane,
bis(4-hydroxyphenyl)cyclohexylmethane,
bis(4-hydroxyphenyl)phenylmethane,
bis(4-hydroxyphenyl)(4-propenylphenyl)methane,
bis(4-hydroxyphenyl)diphenylmethane,
bis(4-hydroxyphenyl)naphthylmethane,
1,1-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
1,1-bis(4-hydroxyphenyl)hexane,
2,2-bis(4-hydroxyphenyl)hexane,
1,1-bis(4-hydroxyphenyl)octane,
2,2-bis(4-hydroxyphenyl)octane,
4,4-bis(4-hydroxyphenyl)heptane,
2,2-bis(4-hydroxyphenyl)nonane,
1,1-bis(4-hydroxyphenyl)decane, and
1,1-bis(4-hydroxyphenyl)dodecane;

bis(hydroxyaryl)cycloalkanes such as
1,1-bis(4-hydroxyphenyl)cyclopentane,
1,1-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butylcyclohexane,
1,1-bis(4-hydroxyphenyl)-4-tert-butylcyclohexane,
1,1-bis(4-hydroxyphenyl)-3-phenylcyclohexane, and
1,1-bis(4-hydroxyphenyl)-4-phenylcyclohexane;

cardo structure-containing bisphenols such as
9,9-bis(4-hydroxyphenyl)fluorene and
9,9-bis(4-hydroxy-3-methylphenyl)fluorene;

dihydroxydiaryl sulfides such as
4,4'-dihydroxydiphenyl sulfide and
4,4'-dihydroxy-3,3'-dimethyldiphenyl sulfide;

dihydroxydiaryl sulfoxides such as
4,4'-dihydroxydiphenyl sulfoxide and
4,4'-dihydroxy-3,3'-dimethyldiphenyl sulfoxide; and dihydroxydiaryl sulfones such as
4,4'-dihydroxydiphenyl sulfone and
4,4'-dihydroxy-3,3'-dimethyldiphenyl sulfone.

Among the preceding, the bis(hydroxyaryl)alkanes are preferred and among them the bis(4-hydroxyphenyl)alkanes are preferred, while 2,2-bis(4-hydroxyphenyl)propane (i.e., bisphenol A) is particularly preferred from the standpoints of the impact resistance and heat resistance.

A single aromatic dihydroxy compound may be used or any combination of two or more in any proportions may be used.

Monomers that are starting materials for aliphatic polycarbonate resins can be exemplified by the following:

alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethylcyclobutane-1,3-diol;

glycols such as ethylene glycol, 2,2'-oxydiethanol (i.e., diethylene glycol), triethylene glycol, propylene glycol, and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether, and bisphenol S bis(2-hydroxyethyl) ether; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

Carbonyl halides, carbonate esters, and so forth are examples of the carbonate precursors among the monomers that are starting materials for polycarbonate resins. A single carbonate precursor may be used or any combination of two or more in any proportions may be used.

The carbonyl halides can be specifically exemplified by phosgene and by haloformates such as the bischloroformates of dihydroxy compounds and the monochloroformates of dihydroxy compounds.

The carbonate esters can be specifically exemplified by diaryl carbonates such as diphenyl carbonate and ditolyl carbonate; dialkyl carbonates such as dimethyl carbonate and diethyl carbonate; and carbonates of dihydroxy compounds, e.g., biscarbonates of dihydroxy compounds, monocarbonates of dihydroxy compounds, and cyclic carbonates.

Method of Polycarbonate Resin Production

There are no particular limitations on the method of producing the polycarbonate resin and any method can be used. Examples thereof are the interfacial polymerization method, melt transesterification method, pyridine method, ring-opening polymerization of a cyclic carbonate compound, and solid-state transesterification of a prepolymer.

Those methods that are particularly advantageous among these methods are specifically described in the following.

Interfacial Polymerization Method

The production of polycarbonate resin by an interfacial polymerization method will be described first.

In an interfacial polymerization method, a dihydroxy compound and a carbonate precursor (preferably phosgene) are reacted in the presence of a reaction-inert organic solvent and an aqueous alkali solution generally while holding the pH at 9 or above, and the polycarbonate resin is obtained by subsequently carrying out an interfacial polymerization in the presence of a polymerization catalyst. As necessary, the reaction system may contain a molecular weight modifier (terminating agent) and may contain an oxidation inhibitor in order to inhibit oxidation of the dihydroxy compound.

The dihydroxy compound and carbonate precursor are as described above. The use of phosgene is preferred among the carbonate precursors, and the method using phosgene is then known in particular as a phosgene method.

The reaction-inert organic solvent can be exemplified by chlorinated hydrocarbons such as dichloromethane, 1,2-dichloroethane, chloroform, monochlorobenzene, and dichlorobenzene, and by aromatic hydrocarbons such as benzene, toluene, and xylene. A single organic, solvent may be used or any combination of two or more organic solvents in any proportions may be used.

The alkali compound in the aqueous alkali solution can be exemplified by alkali metal compounds such as sodium hydroxide, potassium hydroxide, lithium hydroxide, and sodium bicarbonate and by alkaline-earth metal compounds, and among them, sodium hydroxide and potassium hydroxide are preferred. A single alkali compound may be used or any combination of two or more alkali compounds in any proportions may be used.

There are no limitations on the concentration of the alkali compound in the aqueous alkali solution, and generally 5 to 10 mass % is used in order to control the pH in the aqueous alkali solution during the reaction to 10 to 12. In addition, for example, in order to control the pH of the aqueous phase to 10 to 12 and preferably 10 to 11 during phosgene injection, the molar ratio between the bisphenol compound and the alkali compound is generally 1: at least 1.9 and preferably 1: at least 2.0 and is generally 1: not more than 3.2 and preferably 1: not more than 2.5.

The polymerization catalyst can be exemplified by aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; guanine; and guanidine salts. A single polymerization catalyst may be used or any combination of two or more polymerization catalysts in any proportions may be used.

The molecular weight modifier can be exemplified by monohydric aromatic phenols that have a phenolic hydroxyl group; aliphatic alcohols such as methanol and butanol; mercaptan; and phthalimide, among which the aromatic phenols are preferred. These aromatic phenols can be specifically exemplified by alkyl group-substituted phenols such as m-methylphenol, p-methylphenol, m-propylphenol, p-propylphenol, p-tert-butylphenol, and p-(long chain alkyl)-substituted phenol; vinyl group-containing phenols such as isopropenylphenol; epoxy group-containing phenols; and carboxyl group-containing phenols such as o-hydroxybenzoic acid and 2-methyl-6-hydroxyphenylacetic acid. A single molecular weight modifier may be used or any combination of two or more molecular weight modifiers in any proportions may be used.

The amount of use of the molecular weight modifier, expressed per 100 moles of the dihydroxy compound, is generally at least 0.5 moles and is preferably at least 1 mole and is generally not more than 50 moles and is preferably not more than 30 moles. The thermal stability and hydrolysis resistance of the resin composition can be enhanced by having the amount of use of the molecular weight modifier be in the indicated range.

The mixing sequence for the reaction substrates, reaction medium, catalyst, additives, and so forth during the reaction may be freely selected as long as the desired polycarbonate resin is obtained, and the sequence may be freely established as appropriate. For example, when phosgene is used as the carbonate precursor, the molecular weight modifier may be admixed at any time from the reaction between the dihydroxy compound and the phosgene (phosgenation) up to and including the point at which the polymerization reaction is begun.

The reaction temperature is generally 0° C. to 40° C., and the reaction time is generally several minutes (for example, 10 minutes) to several hours (for example, 6 hours).

Melt Transesterification Method

The production of the polycarbonate resin by the melt transesterification method will now be described.

For example, a transesterification reaction between a carbonate diester and a dihydroxy compound is carried out in the melt transesterification method.

The dihydroxy compound is as described above.

The carbonate diester, on the other hand, can be exemplified by dialkyl carbonate compounds such as dimethyl carbonate, diethyl carbonate, and di-tert-butyl carbonate; diphenyl carbonate; and substituted diphenyl carbonates such as ditolyl carbonate. Among these, diphenyl carbonate and substituted diphenyl carbonates are preferred and in particular diphenyl carbonate is more preferred. A single carbonate diester may be used or any combination of two or more carbonate diesters in any proportions may be used.

Any ratio between the dihydroxy compound and carbonate diester may be used as long as the desired polycarbonate resin is obtained, but preferably the carbonate diester is used in at least an equimolar amount per 1 mole of the dihydroxy compound, while the use of at least 1.01 moles per 1 mole of the dihydroxy compound is more preferred. The upper limit is generally 1.30 moles or less. Using this range makes it possible to adjust the amount of hydroxyl terminal group into a suitable range.

The amount of terminal hydroxyl group in a polycarbonate resin tends to exercise a major influence on, inter alia, the thermal stability, hydrolysis stability, and color. Due to this, as necessary the amount of terminal hydroxyl group may be adjusted by any known method. A polycarbonate resin having an adjusted amount of terminal hydroxyl group can be obtained in general by adjustment or control of, for example, the mixing ratio between the carbonate diester and the aromatic dihydroxy compound in the transesterification reaction and/or the depth of the vacuum during the transesterification reaction. The molecular weight of the obtained polycarbonate resin can also generally be adjusted by these processes.

The previously indicated mixing ratio applies when the amount of terminal hydroxyl group is adjusted through adjustment of the mixing ratio between the carbonate diester and dihydroxy compound.

In addition, a separate admixture of the terminating agent may be carried out during the reaction in a more aggressive adjustment method. The terminating agent here can be exemplified by monohydric phenols, monobasic carboxylic acids, and carbonate diesters. A single terminating agent may be used or any combination of two or more terminating agents in any proportions may be used.

A transesterification catalyst is generally used in the production of polycarbonate resin by the melt transesterification method. Any transesterification catalyst can be used. Among transesterification catalysts, for example, the use of alkali metal compounds and/or alkaline-earth metal compounds is preferred. In combination therewith, for example, a basic compound, e.g., a basic boron compound, basic phosphorus compound, basic ammonium compound, or an amine compound, may also be used on an auxiliary basis. A single transesterification catalyst may be used or any combination of two or more transesterification catalysts in any proportions may be used.

The reaction temperature in the melt transesterification method is generally 100° C. to 320° C. The pressure during the reaction is generally a vacuum of 2 mmHg or below. The specific process may be the execution of a melt polycondensation reaction under the indicated conditions while removing by-products, for example, an aromatic hydroxy compound.

The melt polycondensation reaction can be carried out by a batch method or a continuous method. In the case of the batch method, the mixing sequence for the reaction substrates, reaction medium, catalyst, additives, and so forth may be freely selected as long as the desired aromatic polycarbonate resin is obtained, and the sequence may be freely established as appropriate. The melt polycondensation reaction, however, is preferably carried out using a continuous regime based on a consideration of the stability of the polycarbonate resin.

A catalyst deactivator may also be used on an optional basis in the melt transesterification method. Any compound that can neutralize the transesterification catalyst can be used as the catalyst deactivator. Examples here are sulfur-containing acidic compounds and their derivatives. A single catalyst deactivator may be used or any combination of two or more catalyst deactivators in any proportions may be used.

The amount of use of the catalyst deactivator, expressed with reference to the alkali metal or alkaline-earth metal present in the transesterification catalyst, is generally at least 0.5 equivalents and preferably at least 1 equivalent and is generally not more than 10 equivalents and is preferably not more than 5 equivalents. In addition, it is generally at least 1 ppm and generally not more than 100 ppm and preferably not more than 20 ppm, with reference to the polycarbonate resin.

The molecular weight of the polycarbonate resin (A), expressed as the viscosity-average molecular weight (Mv) derived from the solution viscosity measured at a temperature of 25° C. using methylene chloride as the solvent, is preferably 10,000 to 15,000 and is more preferably at least 10,500, even more preferably at least 11,000, particularly at least 11,500, and most preferably at least 12,000, and is more preferably not more than 14,500. Having the viscosity-average molecular weight be at least the lower limit value for the indicated range can bring about additional enhancements in the mechanical strength of the polycarbonate resin composition of the present invention. Having the viscosity-average molecular weight be not more than the upper limit value for the indicated range can better restrain reductions in the fluidity of the polycarbonate resin composition of the present invention and can also raise the molding workability and facilitate the execution of thin-wall molding.

A mixture of two or more polycarbonate resins having different viscosity-average molecular weights may be used, in which case a polycarbonate resin having a viscosity-average molecular weight outside the preferred range given above may be admixed.

The viscosity-average molecular weight [Mv] here refers to the value calculated using Schnell's viscosity equation, i.e., $\eta=1.23\times10^{-4}$ $Mv^{0.83}$, wherein the intrinsic viscosity [$\eta$] (unit: dl/g) at a temperature of 20° C. is determined using methylene chloride as the solvent and using an Ubbelohde viscometer. The intrinsic viscosity [$\eta$] is the value calculated using the following formula and the specific viscosity [$\eta_{sp}$] at each solution concentration [C] (g/dl).

$$\eta = \lim_{c \to 0} \eta_{sp}/c \qquad \text{[Math. 1]}$$

The concentration of the terminal hydroxyl groups in the polycarbonate resin may be freely selected and may be determined by selection as appropriate, but will generally be not more than 1,000 ppm and is preferably not more than 800 ppm and more preferably not more than 600 ppm. This makes it possible to bring about additional improvements in the residence heat stability and color of the polycarbonate resin. In addition, the lower limit here—particularly for polycarbonate resin produced by the melt transesterification method—is generally at least 10 ppm and is preferably at least 30 ppm and more preferably at least 40 ppm. This makes it possible to suppress reductions in the molecular weight and to bring about additional improvements in the mechanical properties of the resin composition.

The unit for the terminal hydroxyl group concentration is the mass of the terminal hydroxyl groups expressed as ppm with reference to the mass of the polycarbonate resin. The measurement method here is colorimetric determination by the titanium tetrachloride/acetic acid method (the method described in Macromol. Chem., 88 215 (1965)).

The polycarbonate resin may be used in the form of polycarbonate resin proper (this polycarbonate resin proper is not limited to an embodiment that contains only a single species of polycarbonate resin, but is used in the sense of including embodiments, for example, that contain a plurality of polycarbonate resin species having different monomer compositions or molecular weights from one another) or may be used in combination with an alloy (mixture) of a polycarbonate resin and another thermoplastic resin. Moreover, it may be structured as a copolymer in which polycarbonate resin is the major portion, for example, as a copolymer of a polycarbonate resin with a siloxane structure-containing oligomer or polymer, with the goal of raising the flame retardancy and impact resistance still further; as a copolymer of a polycarbonate resin with a phosphorus atom-containing monomer, oligomer, or polymer, with the goal of raising the thermal oxidation stability and flame retardancy still further; as a copolymer of a polycarbonate resin with a dihydroxyanthraquinone structure-bearing monomer, oligomer, or polymer, with the goal of improving the thermal oxidation stability; as a copolymer of a polycarbonate resin with an oligomer or polymer having an olefinic structure, e.g., polystyrene, in order to improve the optical properties; or as a copolymer of a polycarbonate resin with a polyester resin oligomer or polymer with the goal of enhancing the chemical resistance.

In addition, the polycarbonate resin may contain a polycarbonate oligomer in order to bring about an improved appearance for the molded article and improve the fluidity. The viscosity-average molecular weight [Mv] of this polycarbonate oligomer is generally at least 1,500 and is preferably at least 2,000 and is generally not more than 9,500 and is preferably not more than 9,000. The incorporated polycarbonate oligomer is preferably not more than 30 masse of the polycarbonate resin (including the polycarbonate oligomer).

Moreover, the polycarbonate resin need not be only a virgin raw material, but may also be a polycarbonate resin that has been regenerated from post-consumer products (what is known as material-recycled polycarbonate resin).

However, regenerated polycarbonate resin preferably is not more than 80 mass % of the polycarbonate resin and is more preferably not more than 50 mass % thereof. Since regenerated polycarbonate resin has a high potential for deterioration, e.g., thermal deterioration, ageing deterioration, and so forth, the use of such a polycarbonate resin in amounts larger than the indicated range creates the possibility of a decline in the hue and mechanical properties.

[Polyalkylene Glycol Copolymer (B)]

The polycarbonate resin composition for a thin optical component of the present invention contains a polyalkylene glycol copolymer (B) having a linear alkylene ether unit (B1) given by general formula (I) below and a branched alkylene ether unit selected from the units given by general formulas (II-1) to (II-4) below.

[Chemical 3]

  (I)

The n in formula (I) is an integer from 3 to 6.

[Chemical 4]

  (II-1)

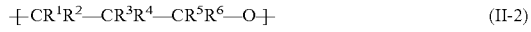  (II-2)

  (II-3)

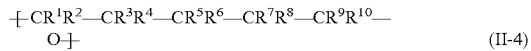  (II-4)

In formulas (II-1) to (II-4), $R^1$ to $R^{10}$ represent a hydrogen atom or an alkyl group having 1 to 3 carbons, and in each of formulas (II-1) to (II-4), at least one of $R^1$ to $R^{10}$ is an alkyl group having 1 to 3 carbons.

The linear alkylene ether unit (B1) given by general formula (I) above is preferably, when considered as the glycol, trimethylene glycol wherein n=3, tetramethylene glycol wherein n=4, pentamethylene glycol wherein n=5, and hexamethylene glycol wherein n=6, and is more preferably trimethylene glycol or tetramethylene glycol and particularly preferably is tetramethylene glycol.

Trimethylene glycol is produced industrially by a method in which ethylene oxide is hydroformylated to yield 3-hydroxypropionaldehyde, which is then hydrogenated, and by a method in which acrolein is hydrated to provide 3-hydroxypropionaldehyde, which is then hydrogenated over an Ni catalyst. In addition, the production of trimethylene glycol has most recently been carried out by a biomethod in which, e.g., glycerol, glucose, starch, and so forth, is microbially reduced.

The branched alkylene ether unit given by general formula (II-1) above can be exemplified, when considered as the glycol, by (2-methyl)ethylene glycol, (2-ethyl)ethylene glycol, and (2,2-dimethyl)ethylene glycol.

The branched alkylene ether unit given by general formula (II-2) above can be exemplified, when considered as the glycol, by (2-methyl)trimethylene glycol, (3-methyl) trimethylene glycol, (2-ethyl)trimethylene glycol, (3-ethyl) triethylene glycol, (2,2-dimethyl)trimethylene glycol, (2,2-methylethyl)trimethylene glycol, (2,2-diethyl)trimethylene glycol (i.e., neopentyl glycol), (3,3-dimethyl)trimethylene glycol, (3,3-methylethyl)trimethylene glycol, and (3,3-diethyl)trimethylene glycol.

The branched alkylene ether unit given by general formula (II-3) above can be exemplified, when considered as the glycol, by (3-methyl)tetramethylene glycol, (4-methyl) tetramethylene glycol, (3-ethyl)tetramethylene glycol, (4-ethyl)tetramethylene glycol, (3,3-dimethyl)tetramethylene glycol, (3,3-methylethyl)tetramethylene glycol, (3,3-diethyl)tetramethylene glycol, (4,4-dimethyl)tetramethylene glycol, (4,4-methylethyl)tetramethylene glycol, and (4,4-diethyl)tetramethylene glycol.

The branched alkylene ether unit given by general formula (II-4) above can be exemplified, when considered as the glycol, by (3-methyl)pentamethylene glycol, (4-methyl) pentamethylene glycol, (5-methyl)pentamethylene glycol, (3-ethyl)pentamethylene glycol, (4-ethyl)pentamethylene glycol, (5-ethyl)pentamethylene glycol, (3,3-dimethyl)pentamethylene glycol, (3,3-methylethyl)pentamethylene glycol, (3,3-diethyl)pentamethylene glycol, (4,4-dimethyl)pentamethylene glycol, (4,4-methylethyl)pentamethylene glycol, (4,4-diethyl)pentamethylene glycol, (5,5-dimethyl) pentamethylene glycol, (5,5-methylethyl)pentamethylene glycol, and (5,5-diethyl)pentamethylene glycol.

The (II-1) to (11-4) constituting the branched alkylene ether unit (B2) have been described above using the glycols as convenient examples, but there is no limitation to these glycols and it should be understood that the description may also be similarly made using their alkylene oxides or their polyether-forming derivatives.

The following are preferred for the polyalkylene glycol copolymer (B): copolymers composed of the tetramethylene ether unit and the unit given by general formula (II-3) above are preferred and copolymers composed of the tetramethylene ether unit and the 3-methyltetramethylene ether unit are more preferred; copolymers composed of the tetramethylene ether unit and the unit given by general formula (II-1) above are also preferred and copolymers composed of the tetramethylene ether unit and the 2-methylethylene ether unit are more preferred; and copolymers composed of the tetramethylene ether unit and the 2,2-dimethyltrimethylene ether unit, i.e., the neopentyl glycol ether unit, are more preferred.

Methods for producing the polyalkylene glycol copolymer (B) having the linear alkylene ether unit (B1) and the branched alkylene ether unit (B2) are known. Production can be carried out generally by subjecting the aforementioned glycol, alkylene oxide, or polyether-forming derivative thereof to polycondensation using an acid catalyst.

The polyalkylene glycol copolymer (B) may be a random copolymer or a block copolymer.

The copolymerization ratio between the linear alkylene ether unit (B1) given by general formula (I) and the branched alkylene ether unit (B2) given by a general formula (II-1) to (11-4) in the polyalkylene glycol copolymer (B), expressed as the (B1)/(B2) molar ratio, is preferably 95/5 to 5/95, more preferably 93/7 to 40/60, and still more preferably 90/10 to 65/35, wherein the linear alkylene ether unit (B1) is more preferably on the rich side.

The molar fraction is measured using $^1$H-NMR measurement instrumentation and using deuterochloroform for the solvent.

The terminal group in the polyalkylene glycol copolymer (B) is preferably the hydroxyl group. In addition, capping one terminal or both terminals with, e.g., alkyl ether, aryl ether, aralkyl ether, fatty acid ester, aryl ester, and so forth, does not influence the expression of the properties and thus the etherized substance or esterified substance can be similarly used.

The alkyl group constituting the alkyl ether can be linear or branched and is a $C_{1-22}$ alkyl group, for example, the methyl group, ethyl group, propyl group, butyl group, octyl group, lauryl group, and stearyl group, wherein the methyl ether, ethyl ether, butyl ether, lauryl ether, stearyl ether, and so forth of the polyalkylene glycol are preferred examples.

The aryl group constituting the aryl ether is preferably a $C_{6-22}$, more preferably a $C_{6-12}$, and even more preferably a $C_{6-10}$ aryl group and can be exemplified by the phenyl group, tolyl group, naphthyl group, and so forth wherein the phenyl group and tolyl group are preferred. The aralkyl group is preferably a $C_{7-23}$, more preferably a $C_{7-13}$, and even more preferably a $C_{7-11}$ group and can be exemplified by the benzyl group, phenethyl group, and so forth wherein the benzyl group is particularly preferred.

The fatty acid constituting the fatty acid ester may be linear or branched and may be a saturated fatty acid or an unsaturated fatty acid.

The fatty acid constituting the fatty acid ester is a $C_{1-22}$ monobasic or dibasic fatty acid, for example, a monobasic saturated fatty acid, e.g., formic acid, acetic acid, propionic acid, butyric acid, valeric acid, caproic acid, enanthoic acid, caprylic acid, capric acid, lauric acid, myristic acid, pentadecanoic acid, palmitic acid, heptadecanoic acid, stearic acid, nonadecanoic acid, arachidic acid, and behenic acid; or a monobasic unsaturated fatty acid, e.g., oleic acid, elaidic acid, linoleic acid, linolenic acid, and arachidonic acid; or a dibasic fatty acid having at least 10 carbons, e.g., sebacic acid, undecanedioic acid, dodecanedioic acid, tetradecanedioic acid, and thapsic acid, as well as decenedioic acid, undecenedioic acid, and dodecenedioic acid.

The aryl group constituting the aryl ester is preferably a $C_{6-22}$, more preferably a $C_{6-12}$ and even more preferably a $C_{6-10}$ aryl group, and can be exemplified by the phenyl group, tolyl group, naphthyl group and so forth wherein the phenyl group and tolyl group are preferred. An excellent compatibility with the polycarbonate is exhibited even when the terminating group is an aralkyl group, which thus can exhibit the same action as the aryl group. The aralkyl group is preferably a $C_{7-23}$, more preferably a $C_{7-13}$, and even more preferably a $C_{7-11}$ aralkyl group, and can be exemplified by the benzyl group, phenethyl group, and so forth wherein the benzyl group is particularly preferred.

The number-average molecular weight of the polyalkylene glycol copolymer (B) is preferably 200 to 5,000, more preferably at least 300 and still more preferably at least 500 and is more preferably not more than 4,000 and still more preferably not more than 3,000. The compatibility declines when the upper limit on the indicated range is exceeded, which is thus disfavored. In addition, gas is produced during molding at below the lower limit on the indicated range, which is thus disfavored. The number-average molecular weight of the polyalkylene glycol copolymer referenced here is the number-average molecular weight determined based on the hydroxyl value measured in accordance with JIS K 1577.

Particularly preferred among the preceding for the polyalkylene glycol copolymer (B) are copolymers composed of the tetramethylene ether unit and 2-methylethylene ether unit, copolymers composed of the tetramethylene ether unit and 3-methyltetramethylene ether unit, and copolymers composed of the tetramethylene ether unit and 2,2-dimethyltrimethylene ether unit. Such polyalkylene glycol copolymers (B) can be specifically exemplified by "Polycerin DCB" (product name, same for the following) from the NOF Corporation, "PTG-L" from Hodogaya Chemical Co., Ltd., and "PTXG" from Asahi Kasei Fibers Corp. Copolymers composed of the tetramethylene ether unit and 2,2-dimethyltrimethylene ether unit can also be produced by the method described in Japanese Patent Application No. 2015-2533.

The content of the polyalkylene glycol copolymer (B) is 0.1 to 4 mass parts per 100 mass parts of the polycarbonate resin (A). The content is preferably at least 0.15 mass parts and more preferably at least 0.2 mass parts and preferably not more than 3.5 mass parts, more preferably not more than 3 mass parts, even more preferably not more than 2.5 mass parts, and particularly preferably not more than 2 mass parts. The improvement in the hue and yellowing is inadequate when the content is below 0.1 mass parts. When the content exceeds 4 mass parts, the transmittance of the polycarbonate resin declines due to cloudiness; also, strand breakage occurs frequently during melt-kneading with an extruder, which then impairs the production of pellets of the resin composition.

[Phosphorus Stabilizer (C)]

The polycarbonate resin composition of the present invention necessarily contains a phosphorus stabilizer. The incorporation of a phosphorus stabilizer causes the polycarbonate resin composition to have an excellent hue and also improves the resistance to thermal discoloration.

Any known phosphorus stabilizer can be used as the phosphorus stabilizer. Specific examples here are the oxo acids of phosphorus, e.g., phosphoric acid, phosphonic acid, phosphorous acid, phosphinic acid, and polyphosphoric acid; acidic pyrophosphate metal salts, e.g., sodium acid pyrophosphate, potassium acid pyrophosphate, and calcium acid pyrophosphate; the phosphates of a Group 1 or Group 2B metal, e.g., potassium phosphate, sodium phosphate, cesium phosphate, and zinc phosphate; and also phosphate compounds, phosphite compounds, and phosphonite compounds, wherein phosphite compounds are particularly preferred. A polycarbonate resin composition having a higher resistance to discoloration and a better continuous production capability is obtained by the selection of a phosphite compound.

This phosphite compound is a trivalent phosphorus compound with the general formula $P(OR)_3$ wherein R is a monovalent or divalent organic group.

These phosphite compounds can be exemplified by triphenyl phosphite, tris(monononylphenyl) phosphite, tris (mononyl-/dinonylphenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, distearyl pentaerythritol diphosphite, bis(2,4-di-tert-butyl-4-methylphenyl) pentaerythritol diphosphite, bis(2,6-di-tert-butylphenyl) octyl phosphite, 2,2-methylenebis(4,6-di-tert-butylphenyl) octyl phosphite, tetrakis(2,4-di-tert-butylphenyl)-4,4'-biphenylene diphosphite, and 6-[3-(3-tert-butyl-hydroxy-5-methylphenyl)propoxy]-2,4,8,10-tetra-tert-butyldibenzo[d,f] [1,3,2]dioxaphosphepine.

Among these phosphite compounds, aromatic phosphite compounds given by formula (a) or (b) below are more preferred in order to effectively increase the resistance to thermal discoloration of the polycarbonate resin composition of the present invention.

[Chemical 5]

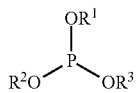

(a)

In formula (a), $R^1$, $R^2$, and $R^3$ may be the same or different and are each a $C_{6-30}$ aryl group.

[Chemical 6]

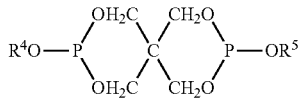

(b)

In formula (b), $R^4$ and $R^5$ may be the same or different and are each a $C_{6-30}$ aryl group.

Among the phosphite compounds given by formula (a), triphenyl phosphite, tris(monononylphenyl) phosphite, tris (2,4-di-tert-butylphenyl) phosphite, and so forth are preferred wherein tris(2,4-di-tert-butylphenyl) phosphite is more preferred. These organophosphite compounds can be specifically exemplified by "Adeka Stab 1178" from ADEKA Corporation, "Sumilizer TNP" from Sumitomo Chemical Co., Ltd., "JP-351" from Johoku Chemical Co., Ltd., "Adeka Stab 2112" from ADEKA Corporation, "Irgafos 168" from BASF SE, and "JP-650" from Johoku Chemical Co., Ltd.

Among the phosphite compounds given by formula (b), those having a pentaerythritol diphosphite structure, such as bis(2,4-di-tert-butyl-4-methylphenyl) pentaerythritol diphosphite, bis(2,6-di-tert-butyl-4-methylphenyl) pentaerythritol diphosphite, and bis(2,4-dicumylphenyl) pentaerythritol diphosphite, are particularly preferred. Specific preferred examples of these organophosphite compounds are "Adeka Stab PEP-24G" and "Adeka Stab PEP-36" from ADEKA Corporation and "Doverphos S-9228" from Dover Chemical Corporation.

Among phosphite compounds, aromatic phosphite compounds given by formula (b) above are more preferred because they provide a better hue.

A single phosphorus stabilizer may be incorporated or any combination of two or more in any proportions may be incorporated.

The content of the phosphorus stabilizer (C), per 100 mass parts of the polycarbonate resin (A), is 0.005 to 0.5 mass parts and is preferably at least 0.007 mass parts, more preferably at least 0.008 mass parts, and particularly preferably at least 0.01 mass parts and is preferably not more than 0.4 mass parts, more preferably not more than 0.3 mass parts, even more preferably not more than 0.2 mass parts, and particularly not more than 0.1 mass parts. The hue and resistance to thermal discoloration are unsatisfactory when the content of the phosphorus stabilizer (C) is less than the 0.005 mass parts of this range. When the content of the phosphorus stabilizer (C) exceeds 0.5 mass parts, not only does the resistance to thermal discoloration deteriorate instead, but the moist heat stability also declines.

[Epoxy Compound (D)]

The resin composition of the present invention preferably also contains an epoxy compound (D). The incorporation of the epoxy compound (D) in combination with the polyalkylene glycol copolymer (B) can bring about additional improvements in the resistance to thermal discoloration.

Compounds that have one or more epoxy groups in each molecule are used as the epoxy compound (D). Preferred specific examples are phenyl glycidyl ether, allyl glycidyl ether, t-butylphenyl glycidyl ether, 3,4-epoxycyclohexylmethyl 3',4'-epoxycyclohexylcarboxylate, 3,4-epoxy-6-methylcyclohexylmethyl 3',4'-epoxy-6'-methylcyclohexylcarboxylate, 2,3-epoxycyclohexylmethyl 3',4'-epoxycyclohexylcarboxylate, 4-(3,4-epoxy-5-methylcyclohexyl)butyl 3',4'-epoxycyclohexylcarboxylate, 3,4-epoxycyclohexylethylene oxide, cyclohexylmethyl 3,4-epoxycyclohexylcarboxylate, 3,4-epoxy-6-methylcyclohexylmethyl 6'-methylcyclohexylcarboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl 2,2-dimethyl-3,4-epoxycyclohexylcarboxylate, n-butyl 2,2-dimethyl-3,4-epoxycyclohexylcarboxylate, cyclohexyl 2-methyl-3,4-epoxycyclohexylcarboxylate, n-butyl 2-isopropyl-3,4-epoxy-5-methylcyclohexylcarboxylate, octadecyl 3,4-epoxycyclohexylcarboxylate, 2-ethylhexyl 3',4'-epoxycyclohexylcarboxylate, 4,6-dimethyl-2,3-epoxycyclohexyl 3',4'-epoxycyclohexylcarboxylate, 4,5-epoxytetrahydrophthalic anhydride, 3-t-butyl-4,5-epoxytetrahydrophthalic anhydride, diethyl 4,5-epoxy-cis-1,2-cyclohexyldicarboxylate, di-n-butyl 3-t-butyl-4,5-epoxy-cis-1,2-cyclohexyldicarboxylate, epoxidized soy oil, and epoxidized linseed oil.

A single epoxy compound may be used by itself or two or more may be used in combination.

Among the preceding, the use of alicyclic epoxy compounds is preferred, wherein 3,4-epoxycyclohexylmethyl 3',4'-epoxycyclohexylcarboxylate is preferred in particular.

The content of the epoxy compound (D), per 100 mass parts of the polycarbonate resin (A), is preferably 0.0005 to 0.2 mass parts and is more preferably at least 0.001 mass parts, even more preferably at least 0.003 mass parts, and particularly preferably at least 0.005 mass parts and is more preferably not more than 0.15 mass parts, even more preferably not more than 0.1 mass parts, and particularly preferably not more than 0.05 mass parts. When the content of the epoxy compound (D) is less than 0.0005 mass parts, the hue and resistance to thermal discoloration are prone to be inadequate. At more than 0.2 mass parts, not only does the resistance to thermal discoloration deteriorate instead, but the hue and moist heat stability also readily decline.

[Additives and so Forth]

The polycarbonate resin composition of the present invention may contain additives other than those described above, for example, additives such as oxidation inhibitors, mold releasing agents, ultraviolet absorbers, fluorescent whiteners, pigments, dyes, polymers other than polycarbonate resins, flame retardants, impact resistance improvers, static inhibitors, plasticizers, compatibilizers, and so forth. A single one of these additives may be incorporated or two or more may be incorporated.

[Method of Producing the Polycarbonate Resin Composition]

There are no limitations on the method for producing the polycarbonate resin composition of the present invention, and the known methods for producing polycarbonate resin compositions may be broadly adopted. An example is a method in which the polycarbonate resin (A), polyalkylene glycol copolymer (B), phosphorus stabilizer (C), and any other components incorporated on an optional basis are preliminarily blended using any of various mixers, for example, a tumbler or Henschel mixer, followed by melt-kneading with a mixer such as a Banbury mixer, roll, brabender, single-screw kneader-extruder, twin-screw kneader-extruder, kneader, and so forth. The melt-kneading temperature is not particularly limited, but is commonly in the range from 240° C. to 320° C.

The polycarbonate resin composition for a thin optical component of the present invention exhibits a high spectral transmittance, and it can have a high spectral transmittance at a wavelength of 420 nm measured for an optical path length of 300 mm preferably of at least 50%.

The spectral transmittance at a wavelength of 420 nm is the transmittance in a wavelength region in proximity to the wavelength region of the blue LEDs widely used with optical components such as light guide plates; in addition, the yellow tint increases when the transmittance in this wavelength region is low.

The spectral transmittance at a wavelength of 420 nm is measured at an optical path length of 300 mm using an injection molded long path length molded article (300 mm×7 mm×4 mm) and specifically in accordance with the method described in the examples below.

[Thin Optical Component]

The polycarbonate resin composition for a thin optical component of the present invention can produce a thin optical component by molding, using any of various molding methods, pellets provided by pelletizing the hereabove-described polycarbonate resin composition. In addition, the thin optical component may also be made without going through the pellet stage, by directly molding the resin that has undergone melt-kneading at an extruder.

The polycarbonate resin composition of the present invention is favorably used for the molding of a thin optical component by injection molding because it has an excellent fluidity; because it provides an excellent appearance, which is free of white spot foreign material, for the molded article even when made into a thin molded article; and because it can provide a good balance between the transmittance and hue. With regard to the resin temperature during injection molding, molding is preferably carried out at a resin temperature higher than the 260° C. to 300° C. temperatures generally used in the injection molding of polycarbonate resins, and a resin temperature of 305° C. to 380° C. is preferred. The resin temperature is more preferably at least 310° C., even more preferably at least 315° C., and particularly preferably at least 320° C., and is more preferably not more than 370° C. When the resin temperature during molding using conventional polycarbonate resin compositions has been raised in order to mold a thin molded article, the problem has also appeared of the ready occurrence of white spot foreign material on the surface of the molded article. However, the use of the resin composition of the present invention makes it possible to produce, even in the temperature range indicated above, thin molded articles having an excellent appearance.

The resin temperature is understood here to be the barrel set temperature when direct measurement is problematic.

The thin molded article in the present invention generally refers to a molded article that has a plate-shaped part having a thickness of not more than 1 mm and preferably not more than 0.8 mm and more preferably not more than 0.6 mm. This plate-shaped part may be a flat plate or may assume a curved plate configuration; it may have a flat, smooth surface or may have, for example, peaks-and-valleys in the surface; and its cross section, for example, may have a sloping side or may be a wedge-shaped cross section.

The thin optical component can be exemplified by components for equipment and devices that directly or indirectly utilize a light source such as, for example, an LED, organic EL, incandescent light bulb, fluorescent lamp, cathode tube, and so forth, and typical examples are light guide plates and components for surface light emitters.

A light guide plate is responsible for guiding the light from a light source, e.g., an LED, in a liquid crystal backlight unit, various display devices, and lighting equipment, and, generally, through peaks-and-valleys disposed in its surface, diffuses light entering from its side or back side and outputs a uniform light. Its shape is generally a flat plate shape, and it may or may not have peaks-and-valleys on its surface.

The molding of light guide plates is generally carried out preferably by, for example, injection molding methods, ultrahigh speed injection molding methods, and injection compression molding methods.

Light guide plates molded using the resin composition of the present invention are free of cloudiness and free of a reduction in transmittance and have a very good transmittance and hue.

A light guide plate based on the polycarbonate resin composition of the present invention can be advantageously used for liquid crystal backlight units and in various sectors related to display devices and lighting equipment. These devices and equipment can be exemplified by mobile terminals such as cell phones, mobile notebooks, netbooks, slate PCs, tablet PCs, smart phones, and tablet form-factor terminals, and also by cameras, watches and clocks, laptop personal computers, various displays, lighting equipment, and so forth.

EXAMPLES

Examples are provided below in order to more specifically describe the present invention. However, this should not be interpreted as limiting the present invention to the following examples.

The starting materials and evaluation methods used in the following examples and comparative examples are as follows. The method for measuring the viscosity-average molecular weight of the polycarbonate resin (A) is as described above.

TABLE 1

| component | designation | |
|---|---|---|
| polycarbonate resin (A) | A1 | aromatic polycarbonate resin for which bisphenol A is a starting material viscosity-average molecular weight = 14,000 |
| | A2 | aromatic polycarbonate resin for which bisphenol A is a starting material viscosity-average molecular weight = 12,500 |
| polyalkylene glycol copolymer (B) | B1 | polyalkylene glycol copolymer given by HO—$(CH_2CH_2CH_2CH_2O)_m$—/—$(CH_2CH(CH_3)CH_2CH_2O)_n$—H product name "PTG-L", from Hodogaya Chemical Co., Ltd. number-average molecular weight = 1,000 m/n molar ratio: 85.9/14.1 |
| | B2 | polyalkylene glycol copolymer given by HO—$(CH_2CH_2CH_2CH_2O)_m$—/—$(CH(CH_3)CH_2O)_n$H product name "Polycerin DCB-1000", from the NOF Corporation number-average molecular weight = 1,000 m/n molar ratio: 45.7/54.3 |
| other polyalkylene glycol | X1 | poly(2-methyl)ethylene glycol given by HO—$(CH(CH_3)CH_2O)_n$—H product name "Uniol D-2000", from the NOF Corporation number-average molecular weight = 2,000 |
| | X2 | polyalkylene glycol copolymer given by HO—$(CH(CH_3)CH_2O)_m$—/$(CH_2CH_2O)_n$—H Sigma-Aldrich number-average molecular weight = 2,500 m/n molar ratio: 20.5/79.5 |
| phosphorus stabilizer (C) | C1 | bis(2,6-di-tert-butyl-4-methylphenyl) pentaerythritol diphosphite product name "Adeka Stab PEP-36", from the ADEKA Corporation |
| | C2 | bis(2,4-dicumylphenyl) pentaerythritol diphosphite product name "Doverphos S-9228PC", from the Dover Chemical Corporation |
| epoxy compound (D) | D | 3,4-epoxycyclohexylmethyl 3',4'-epoxycyclohexanecarboxylate product name "Celloxide 2021P", from Daicel Corporation |

Examples 1 to 13 and Comparative Examples 1 to 4

[Production of Resin Composition Pellets]

The components indicated above were blended in the proportions (mass parts) given in Tables 2 and 3 below and were mixed for 20 minutes with a tumbler and were subsequently melt-kneaded at a cylinder temperature of 240° C. with a vented single-screw extruder ("VS-40" from Tanabe Plastics Machinery Co., Ltd.) having a screw diameter of 40 mm and pellets were obtained by strand cutting.

[Measurement of the Hue (YI) and Light Transmittance]

The obtained pellets were dried for 5 to 7 hours at 120° C. using a hot air current circulation drier followed by the molding of a long path length molded article (300 mm×7 mm×4 mm) at a resin temperature of 340° C. and a mold temperature of 80° C. using an injection molder ("EC100SX-2A" from Toshiba Machine Co., Ltd.).

The YT (yellowing) at an optical path length of 300 mm and the spectral transmittance (unit: %) at a wavelength of 420 nm were measured using this long path length molded article. A long path length transmission spectrophotometer ("ASA 1" from Nippon Denshoku Industries Co., Ltd., light source C, 2° field) was used for the measurements.

The results of these evaluations are given in the following Tables 2 and 3.

TABLE 2

| | | examples | | | | | | | |
|---|---|---|---|---|---|---|---|---|---|
| component | designation | 1 | 2 | 3 | 4 | 5 | 6 | 7 | 8 |
| polycarbonate resin (A) | A1 | 100 | 100 | 100 | | 100 | 100 | 100 | 100 |
| | A2 | | | | 100 | | | | |
| polyalkylene glycol copolymer (B) | B1 | 0.50 | 0.70 | 1.00 | 1.20 | | 1.00 | | |
| | B2 | | | | | 1.00 | | 1.00 | 1.00 |
| other polyalkylene glycol | X1 | | | | | | | | |
| | X2 | | | | | | | | |
| phosphorus stabilizer (C) | C1 | 0.05 | 0.05 | 0.05 | 0.05 | 0.05 | | | |
| | C2 | | | | | | 0.05 | 0.05 | 0.02 |

TABLE 2-continued

|  |  | examples | | | | | | | |
|---|---|---|---|---|---|---|---|---|---|
| component | designation | 1 | 2 | 3 | 4 | 5 | 6 | 7 | 8 |
| epoxy component (D) | D |  |  |  |  |  |  |  | 0.03 |
|  | YI (300 mm) | 18.8 | 16.9 | 16.9 | 16.4 | 19.1 | 16.2 | 16.5 | 16.3 |
|  | transmittance (420 nm, %) | 51.2 | 54.1 | 55.1 | 55.4 | 50.9 | 56.8 | 55.8 | 56.4 |

TABLE 3

|  |  | examples | | | | | comparative examples | | | |
|---|---|---|---|---|---|---|---|---|---|---|
| component | designation | 9 | 10 | 11 | 12 | 13 | 1 | 2 | 3 | 4 |
| polycarbonate resin (A) | A1 | 100 | 100 | 100 | 100 | 100 | 100 | 100 | 100 | 100 |
|  | A2 |  |  |  |  |  |  |  |  |  |
| polyalkylene glycol copolymer (B) | B1 | 1.00 | 1.00 | 1.50 | 2.50 |  | 0.05 |  |  |  |
|  | B2 |  |  |  |  | 2.50 |  |  |  |  |
| other polyalkylene glycol | X1 |  |  |  |  |  |  | 0.50 |  |  |
|  | X2 |  |  |  |  |  |  |  |  | 0.50 |
| phosphorus stabilizer (C) | C1 | 0.03 | 0.05 | 0.05 | 0.05 | 0.05 | 0.05 | 0.05 | 0.05 | 0.05 |
|  | C2 |  |  |  |  |  |  |  |  |  |
| epoxy compound (D) | D | 0.01 | 0.02 |  |  |  |  |  |  |  |
|  | YI (300 mm) | 15.7 | 16.2 | 16.3 | 14.3 | 14.7 | 21.8 | 20.5 | 23.9 | 21.2 |
|  | transmittance (420 nm, %) | 56.9 | 56.6 | 55.3 | 58.9 | 58.3 | 45.9 | 48.8 | 42.7 | 41.7 |

Comparative Example 5

Pelletization was investigated by the same method as in Example 1, but using 5 mass parts for the component B1 in Example 1; however, the resin clouded up and a transparent resin composition was not obtained.

Examples 14 to 20

The tetramethylene ether unit and the 2,2-dimethyltrimethylene ether unit (i.e., unit derived from neopentyl glycol) as shown in Table 4 below were used for the polyalkylene glycol copolymer (B), and the mold releasing agent indicated below was also used.

The results of the evaluations are given in Table 5.

TABLE 4

| component | designation |  |
|---|---|---|
| polycarbonate resin (A) | A1 | aromatic polycarbonate resin for which bisphenol A is a starting material viscosity-average molecular weight = 14,000 |
|  | A2 | aromatic polycarbonate resin for which bisphenol A is a starting material viscosity-average molecular weight = 12,500 |
| polyalkylene glycol copolymer (B) | B3 | polyalkylene glycol copolymer given by HO—$(CH_2CH_2CH_2CH_2O)_m$—/—$(CH_2C(CH_3)_2CH_2O)_n$—H number-average molecular weight = 1,250 m/n molar ratio: 70/30 |
| phosphorus stabilizer (C) | C1 | bis(2,6-di-tert-butyl-4-methylphenyl) pentaerythritol diphosphite product name "Adeka Stab PEP-36", from the ADEKA Corporation |
|  | C2 | bis(2,4-dicumylphenyl) pentaerythritol diphosphite product name "Doverphos S-9228PC", from the Dover Chemical Corporation |

TABLE 4-continued

| component | designation | |
|---|---|---|
| epoxy compound (D) | D | 3,4-epoxycyclohexylmethyl 3',4'-epoxycyclohexanecarboxylate product name "Celloxide 2021P", from Daicel Corporation |
| mold releasing agent (E) | E | glycerol monostearate product name "Rikemal S-100A", from Riken Vitamin Co., Ltd. |

TABLE 5

| component | designation | examples | | | | | | |
|---|---|---|---|---|---|---|---|---|
| | | 14 | 15 | 16 | 17 | 18 | 19 | 20 |
| polycarbonate resin (A) | A1 | 100 | 100 | 100 | | 100 | 100 | 100 |
| | A2 | | | | 100 | | | |
| polyalkylene glycol copolymer (B) | B3 | 0.50 | 0.70 | 1.00 | 1.00 | 1.00 | 1.00 | 2.00 |
| phosphorus stabilizer (C) | C1 | 0.05 | 0.05 | 0.05 | 0.05 | 0.03 | 0.02 | 0.02 |
| | C2 | | | | | | | |
| epoxy compound (D) | D | | | | | 0.01 | 0.03 | 0.03 |
| mold releasing agent (E) | E | | | | | | | |
| YI (300 mm) | | 18.2 | 16.5 | 14.8 | 14.9 | 14.2 | 14.9 | 16.6 |
| transmittance (420 nm, %) | | 52.3 | 55.2 | 58.1 | 57.9 | 59.1 | 57.9 | 55.0 |

As is clear from Tables 2, 3, and 5, the molded articles according to the examples exhibit a small YI for a long optical path length of 300 mm and thus exhibit little yellowing. In addition, the light transmittance at 420 nm is also high and the transparency is thus excellent.

In the comparative examples, on the other hand, the YI for 300 mm is shown to be higher than that for the examples. The light transmittance is also lower.

Thus, it is shown that the object of the present invention, i.e., providing a polycarbonate resin composition for a thin optical component that exhibits a good transmittance and hue, is achieved only when all of the conditions of the present invention are satisfied.

INDUSTRIAL APPLICABILITY

The polycarbonate resin composition of the present invention has a very good transmittance and hue and thus can be very advantageously used for thin optical components and has a very high industrial applicability.

The invention claimed is:

1. A polycarbonate resin composition, the composition comprising:

(A) 100 mass parts of a polycarbonate resin (A);

(B) 0.1 to 4 mass parts of a polyalkylene glycol copolymer (B) having a linear alkylene ether unit (B1) given by general formula (I) below and a branched alkylene ether unit (B2) selected from the group consisting of units of formulas (II-2) to (II-4) below:

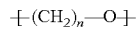  (I)

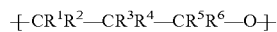  (II-2)

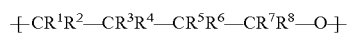  (II-3)

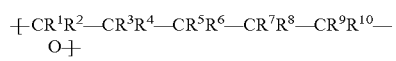  (II-4)

wherein:

n is an integer from 3 to 6;

$R^1$ to $R^{10}$ independently represent a hydrogen atom or an alkyl group having 1 to 3 carbons; and in each of formulas (II-2) to (II-4), at least one of $R^1$ to $R^{10}$ is an alkyl group having 1 to 3 carbons;

(C) 0.005 to 0.5 mass parts of a phosphorus stabilizer (C); and (D) 0.0005 to 0.2 mass parts per 100 mass parts of an epoxy compound (D) per the 100 mass parts of the polycarbonate resin (A).

2. The polycarbonate resin composition according to claim 1, wherein the molar ratio between the (B1) unit and the (B2) unit in the polyalkylene glycol copolymer (B) is 95/5 to 5/95.

3. The polycarbonate resin composition according to claim 1, wherein the polyalkylene glycol copolymer (B) is a copolymer comprising a tetramethylene ether unit and the unit of formula (II-4).

4. The polycarbonate resin composition according to claim 1, wherein the viscosity-average molecular weight (Mv) of the polycarbonate resin (A) is 10,000 to 15,000.

5. The polycarbonate resin composition according to claim 1, wherein a spectral transmittance of the polycarbonate resin composition at a wavelength of 420 nm measured for an optical path length of 300 mm is at least 50%.

6. The polycarbonate resin composition according to claim 1, wherein the mass ratio of the content of epoxy compound (D) to polyalkylene glycol copolymer (B) is 0.1-0.3 to 1.

7. The polycarbonate resin composition according to claim 1, wherein the mass ratio of the content of epoxy compound (D) to polyalkylene glycol copolymer (B) is 0.2-0.3 to 1.

8. The polycarbonate resin composition according to claim 1, wherein the polyalkylene glycol copolymer (B) is a copolymer comprising a tetramethylene ether unit and the unit of formula (II-3).

9. The polycarbonate resin composition according to claim 8, wherein the polyalkylene glycol copolymer (B) is a copolymer comprising the tetramethylene ether unit and a 3-methyl tetramethylene ether unit.

10. The polycarbonate resin composition according to claim 1, wherein the polyalkylene glycol copolymer (B) is a copolymer comprising a tetramethylene ether unit and the unit of formula (II-2).

11. The polycarbonate resin composition according to claim 10, wherein the polyalkylene glycol copolymer (B) is a copolymer comprising the tetramethylene ether unit and a 2,2-dimethyl trimethylene ether unit.

12. The polycarbonate resin composition according to claim 1, wherein
the polyalkylene glycol copolymer (B) consists of linear alkylene ether units (B1) given by general formula (I) and branched alkylene ether units (B2) given by formula (II-2),
the molar ratio between the (B1) unit and the (B2) unit in the polyalkylene glycol copolymer (B) is 90/10 to 65/35, and
the number-average molecular weight of the polyalkylene glycol copolymer (B) is 300-4000.

13. The polycarbonate resin composition according to claim 12, wherein the viscosity-average molecular weight (Mv) of the polycarbonate resin (A) is 10,000 to 15,000, and a spectral transmittance of the polycarbonate resin composition at a wavelength of 420 nm measured for an optical path length of 300 mm is at least 50%.

14. The polycarbonate resin composition according to claim 1, wherein
the polyalkylene glycol copolymer (B) consists of linear alkylene ether units (B1) given by general formula (I) and branched alkylene ether units (B2) given by formula (II-3),
the molar ratio between the (B1) unit and the (B2) unit in the polyalkylene glycol copolymer (B) is 90/10 to 65/35, and
the number-average molecular weight of the polyalkylene glycol copolymer (B) is 300-4000.

15. The polycarbonate resin composition according to claim 14, wherein the viscosity-average molecular weight (Mv) of the polycarbonate resin (A) is 10,000 to 15,000, and a spectral transmittance of the polycarbonate resin composition at a wavelength of 420 nm measured for an optical path length of 300 mm is at least 50%.

16. The polycarbonate resin composition according to claim 1, wherein
the polyalkylene glycol copolymer (B) consists of linear alkylene ether units (B1) given by general formula (I) and branched alkylene ether units (B2) given by formula (II-4),
the molar ratio between the (B1) unit and the (B2) unit in the polyalkylene glycol copolymer (B) is 90/10 to 65/35, and
the number-average molecular weight of the polyalkylene glycol copolymer (B) is 300-4000.

17. The polycarbonate resin composition according to claim 16, wherein the viscosity-average molecular weight (Mv) of the polycarbonate resin (A) is 10.000 to 15,000, and a spectral transmittance of the polycarbonate resin composition at a wavelength of 420 nm measured for an optical path length of 300 mm is at least 50%.

18. A thin optical component obtained by molding the polycarbonate resin composition of claim 1.

19. The thin optical component according to claim 18, which is a light guide plate having a thickness of not more than 1 mm.

20. A method for producing a thin optical component having a thickness of not more than 1 mm, the method comprising:
injection molding the polycarbonate resin composition of claim 1 at 305° C. to 380° C.

* * * * *